Figure 1A:
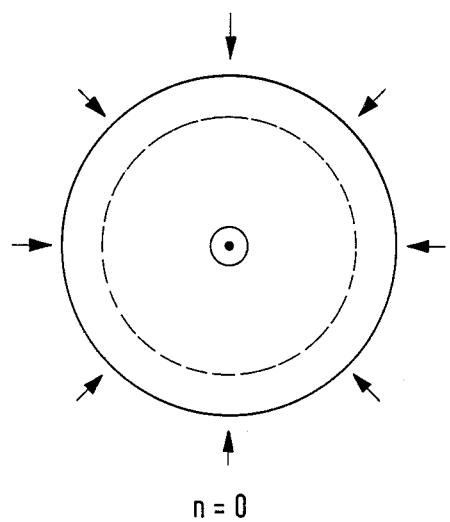

United States Patent [19]
Lang et al.

[11] Patent Number: 4,949,583
[45] Date of Patent: Aug. 21, 1990

[54] METHOD OF MASS FLOW MEASUREMENT BY THE CORIOLIS PRINCIPLE AND MASS FLOW METER OPERATING BY THE CORIOLIS PRINCIPLE

[75] Inventors: Michael Lang, Weil-Haltingen, Fed. Rep. of Germany; Jaime Donoso, Reinach, Switzerland

[73] Assignee: Flowtec AG, Reinach, Switzerland

[21] Appl. No.: 273,360

[22] Filed: Nov. 17, 1988

[30] Foreign Application Priority Data

Nov. 20, 1987 [DE] Fed. Rep. of Germany ....... 3739383
Mar. 14, 1988 [DE] Fed. Rep. of Germany ....... 3808461

[51] Int. Cl.$^5$ ............................................. G01F 1/84
[52] U.S. Cl. ............................. 73/861.37; 73/861.18
[58] Field of Search ........... 73/861.18, 861.21, 861.37, 73/861.38

[56] References Cited

U.S. PATENT DOCUMENTS

3,444,723  5/1969  Wakefield .
4,420,983  12/1983  Langdon .......................... 73/861.18

FOREIGN PATENT DOCUMENTS

0109218  5/1984  European Pat. Off. .
0119638  9/1984  European Pat. Off. .
0210308  2/1987  European Pat. Off. .
3505166  8/1987  Fed. Rep. of Germany .
57-317818  8/1982  Japan .
58-206926  12/1983  Japan .
WO85/05677  12/1985  PCT Int'l Appl. .
WO87/06691  11/1987  PCT Int'l Appl. .
2171200  8/1986  United Kingdom .

OTHER PUBLICATIONS

Stiffen and Stumm, "Direkte Massedurchflussmessung, Insbesondere Mit Coroiolisverfahren", Messen Prufen Automatisieren, May 1987, pp. 301-305.

Primary Examiner—Herbert Goldstein
Attorney, Agent, or Firm—Barnes & Thornburg

[57] ABSTRACT

In the method for mass flow measurement by the Coriolis principle a fluid-traversed elastically deformable measuring tube is periodically deflected. As a measure of the mass flow phase displacements are measured between deflections of portions of the measuring tube wall which are arranged differently in the flow direction. For this purpose a periodic deformation of the cross-section of the measuring tube is effected in such a manner that portions of the measuring tube wall lying diametrically opposite each other are deflected in each case through about the same distance in opposite or the same direction transversely of the flow direction of the fluid. This method can be carried out with a simply constructed mass flow meter in the operation of which a wandering of the center of gravity of the meter is substantially avoided and which is also suitable for large nominal widths.

21 Claims, 4 Drawing Sheets n = 0 n = 2 n = 3 n = 4

METHOD OF MASS FLOW MEASUREMENT BY THE CORIOLIS PRINCIPLE AND MASS FLOW METER OPERATING BY THE CORIOLIS PRINCIPLE

The invention relates to a method for mass flow measurement by the Coriolis principle with an elastically deformable measuring tube through which fluid flows and which is periodically deflected, and in which as a measure of the mass flow phase displacements between deflections of portions of the measuring tube wall arranged differently in the flow direction are measured, and to a mass flow meter operating by the Coriolis principle.

It is known (JP-OS No. 57-137-818) to carry out mass flow measurements with a single measuring tube The measuring tube is fixedly clamped at both its ends In its centre it is stimulated to execute flexural oscillations transversely of the flow direction, i.e. the inner and outer profile of the measuring tube is deformed with predetermined period duration in a plane along the flow direction of the fluid. Due to the firm clamping at the two ends a single half-wave with periodically varying antinode extends over the entire measuring tube length. If fluid of a certain mass now flows through the measuring tube due to the Coriolis forces occurring the form of the half-wave is distorted (phase-displaced). However, these flexural oscillations in the form of a single half-wave cause a periodic wandering of the centre of gravity of the mass flow meter. The centre of gravity wandering leads as a rule to vibrations of the housing of the measuring device and the fluid conduit in which the mass flow meter is inserted. These vibrations transmitted to the surroundings lead to a loss of flexural oscillation energy of the measuring tube If the energy dispersed is different on the entry side and the exit side, for example due to different degrees of firmness of the clampings of the measuring tube, this affects the phase displacements to be measured. In particular, shifts of the zero point of the phase displacement can occur and consequently measurement inaccuracies.

It is further known (German patent No. 3,505,166) to carry out mass flow measurements with two measuring tubes The two measuring tubes are connected hydrodynamically in parallel at the entry and exit side by means of two tube connectors. The measuring tubes are set in opposite flexural oscillations so that the walls of the first measuring tube are deflected phase-displaced through 180 degrees with respect to those of the second measuring tube. This avoids a wandering of the centre of gravity of the mass flow meter. However, an oscillating measuring tube system having at least two measuring tubes is necessary.

In a mass flow meter of the type mentioned at the beginning (international patent publication No. WO 87/06 691) a single measuring tube is fixedly clamped at both its ends and stimulated to execute flexural oscillations in a higher "antisymmetrical" oscillation mode. This corresponds to a flexural oscillation form in which two half-waves extend over the entire measuring tube length. Three socalled oscillation nodes arise in the measuring tube centre and at the two measuring tube ends and between the oscillation nodes oppositely directed periodic bulges occur, i.e. between the oscillation nodes socalled oscillation antinodes occur.

Although due to the oppositely identical bulging of the measuring tube a periodic wandering of the centre of gravity of the meter is avoided, an ovally formed cross-section is necessary for the measuring tube at the points where the oscillation amplitudes are greatest (oscillation antinodes) to reduce the flexural resistance at these points. This construction of the cross-section leads to more expenditure in production In addition, at the measuring tube ends firm clamping points are necessary to form the oscillation nodes, at which turning moments act due to the flexural oscillations. Finally, with increasing measuring tube diameters (nominal widths) the generation of the flexural oscillations becomes increasingly more complicated and difficult, in particular in a higher oscillation mode.

The invention is therefore based on the problem of providing a method of the type mentioned at the beginning which whilst avoiding the aforementioned disadvantages can be carried out with a meter which can be made simply and economically and is of simple and compact structure as well as being reliable in operation and substantially without disturbing influence on its measuring environment; it is to be operable without periodic wandering of the centre of gravity and able to manage large nominal widths.

According to the invention for measuring tubes an oscillation mode is chosen in which portions or sections of the measuring tube lying opposite each other symmetrically with respect to the centre longitudinal axis (centre axis) of the measuring tube are deflected in equal or opposite senses, i.e. in phase with each other or phase-displaced by 180 degrees. The deflections of the walls are achieved by elastically reversible deformation of the measuring tube cross-section. If fluid of a predetermined mass flows from a fluid conduit into the measuring tube periodically deformed in this manner then it must absorb the energy of the deformation oscillations at the entry side and give up this absorbed energy again at the exit side. This means that Coriolis forces occur which at the entry side retard the deformation and thus the deflection of the measuring tube walls and at the exit side accelerate said deformation. The thus resulting phase-displacement of the deflections of the sections of the measuring tube wall, which are differently distributed over the measuring tube length, can be measured for determining the mass flow.

In the mass flow measuring according to the invention it is fundamentally no longer necessary to stimulate measuring tubes to execute flexural oscillations This achieves the advantage that in the regions of the firm clamping and/or free suspension of the measuring tube ends no turning moments act. A further advantage is that when using the method according to the invention for large nominal widths, compared with conventional measuring methods with tubes set in flexural oscillations, shorter measuring tube lengths can be employed.

According to an expedient further development of the invention the reciprocal of the period duration of the cross-sectional deformations is substantially identical to one of the natural/resonance frequences of oscillations of the periphery of the measuring tube in the radial direction. This results in a deflection of the measuring tube walls in such a manner that the position of the centroidal axis of the measuring tube remains substantially constant. Consequently, with the mass flow measurement according to the invention periodic wanderings of the centre of gravity of the measuring device and thus vibrations transmitted to the environment thereof are largely avoided without any additional constructional expenditure being necessary.

According to a further development of the invention the resonance frequency for the peripheral oscillations of the measuring tube are selected so that an oscillation mode of higher order arises, i.e. on the measuring tube wall in the peripheral direction of the measuring tube waves of the number n where n is greater than zero form. Oscillation nodes with antinodes therebetween form uniformly distributed over the periphery of the measuring tube, in each case twice n in number.

An additional problem is that of obtaining adequate measuring sensitivity and/or oscillation stability. This is solved according to a further development of the invention in which in the measuring tube flexural oscillations are stimulated in addition to the peripheral oscillations It appears particularly advantageous here to choose on the one hand for the flexural oscillations a mode in which along the measuring tube two half-waves with a node in the measuring tube centre arise (mode of the second order). This oscillation node contributes to increasing the stability of the peripheral oscillations on which the mass flow measurement is based It appears particularly advantageous to choose for the peripheral oscillations the mode of the order n where n is three or four. In this further development of the invention due to the flexural oscillations alternating turning moments inevitably occur at the clamping points of the measuring tube. Their possibly undesired effects can for example be attenuated or eliminated by mechanical filter arrangements consisting for example of mass and/or spring and/or damping elements.

The periodic deformation of the measuring tube can expediently be achieved in that the measuring tube walls are correspondingly deflected by externally generated alternating forces which are directed onto the measuring tube wall and the frequency of which corresponds to the natural/resonance frequency of the peripheral oscillations of the measuring tube. This makes it possible to reduce the consumption of oscillation energy to be applied in order to obtain sufficient measuring effect.

According to a specific embodiment of the invention on diametrically opposite portions or points of the measuring tube wall forces are applied which are phase-displaced by 180 degrees with respect to each other. As a result in this area the measuring tube is subjected to tensile stress and compressive stress in mirror symmetry to its centre axis. This makes it possible to obtain an easily detectable deflection of the measuring tube wall over the measuring tube length. Preferably, the engagement points of the forces are in the centre region of the measuring tube because the fluid mass in said region must not absorb or liberate deformation energy, i.e. practically no Coriolis forces act. Moreover, this is the point of minimum influence of any fixed clamping points of the measuring tube counteracting the deflecting of the measuring tube wall.

To obtain over the measuring tube length a high resolution in the measurement of the phase displacement of the deflections of the measuring tube walls two measuring points are arranged as far apart as possible. Preferably, they are provided in the vicinity of the entry and exit end of the measuring tube.

In a measuring device or meter for application of the invention the essential point is that the oscillation exciter generating the periodic deformations of the measuring tube is so constructed and arranged that the measuring tube wall is deflected substantially uniformly with respect to the central axis or centroidal axis of the measuring tube and perpendicularly to the flow direction of the fluid. The wall movements compensate each other in such a manner that the original centre of gravity balance of the measuring device is substantially retained.

This is done according to a particular embodiment of the invention in that two for example electromagnetic, electroacoustic and/or electrostatic oscillation exciters are in each case in operative contact with wall portions of the measuring tube which lie opposite each other. Preferably, the oscillations generated by the oscillation exciters are phase-displaced with respect to each other by 180 degrees. This results in a deformation of the measuring tube which is particularly uniform about the centroidal axis of the measuring tube and easily detectable According to an alternative embodiment of the invention the peripheral oscillations of the measuring tube are generated by a single oscillation exciter which is in operative connection with at least one portion of the measuring tube wall. This permits a particularly economical production of a mass flow meter. Depending on the construction of the oscillation exciter unbalances are produced on the measuring tube. To balance these out, according to the invention at the region of the measuring tube wall diametrically opposite the oscillation exciter a compensating body is disposed.

To permit the use of simply constructed and applicable vibration exciters measuring tubes may be employed which have a form symmetrical about their longitudinal axis, for example a cylindrical form. Advantageously, measuring tubes are used which are polygonal in section transversely of the flow direction. If the measuring tube has for example a square cross-sectional form the four corners each form zones in which the measuring tube walls undergo practically no deflection (oscillation nodes). This means on the other hand that zones of maximum deflection of the measuring tube wall occur mainly in the centre regions of the side portions formed by the corners (antinodes). This results in regions on the measuring tube wall which have particularly favourable requirements for detection of the phase displacement.

Advantageously, for measuring the deflection of the measuring tube walls optically operating sensors are employed. These have a very rapid response behaviour compared with electromechanical systems and thus a low inherent phase-displacement.

Fundamentally, it lies within the scope of the invention to arrange the oscillation exciters both outside the measuring tube and within the measuring tube to generate the cross-sectional deformations.

Figure 1B:
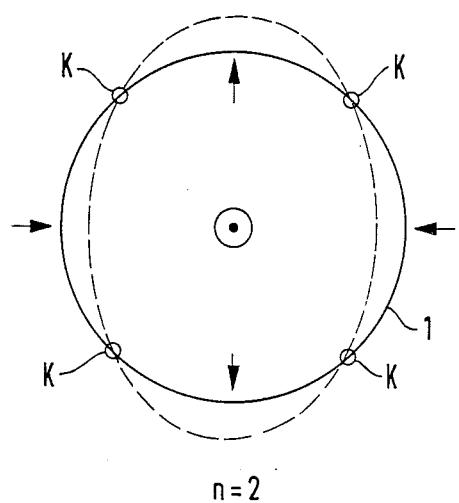
Figure 1C:
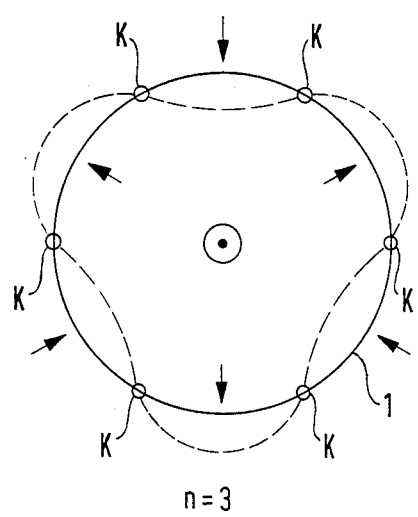
Figure 2:
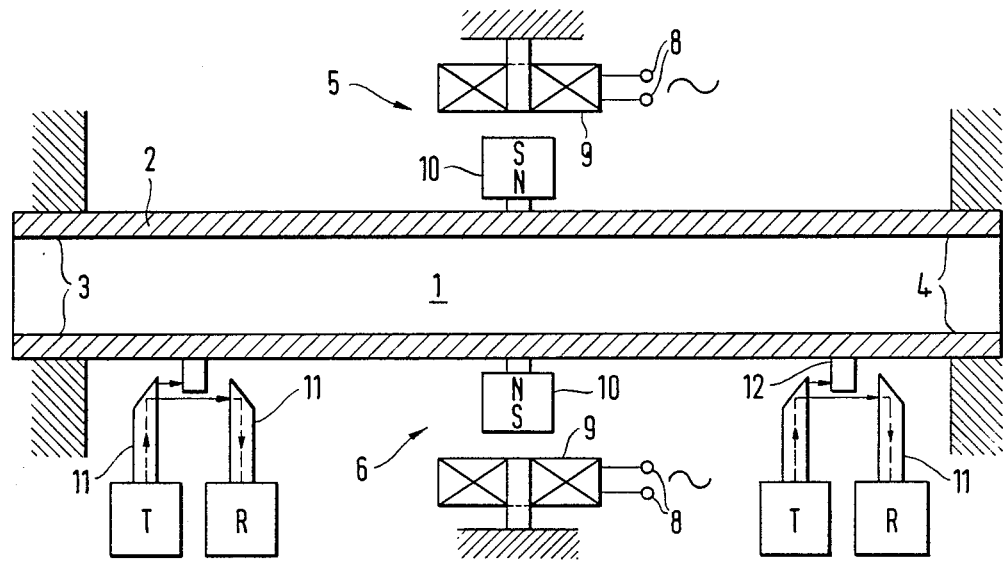
Figure 3:
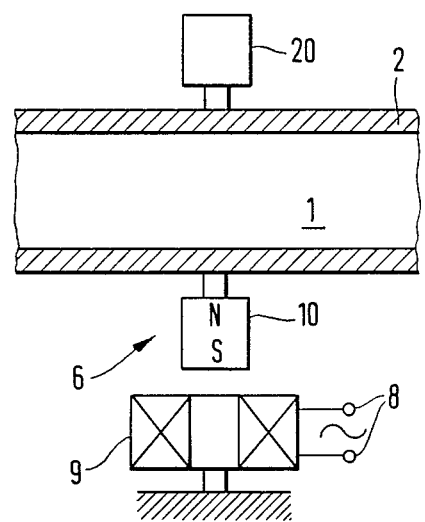
Figure 4A:
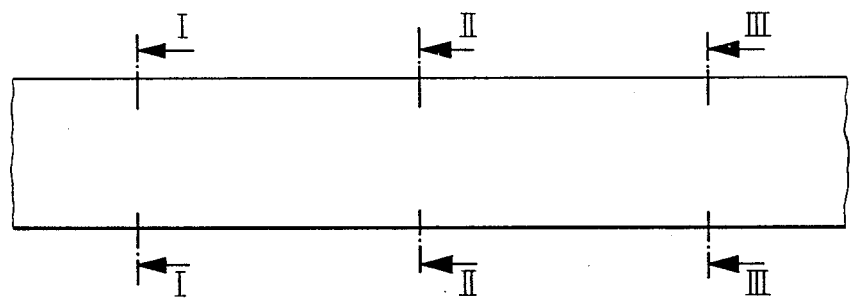
Figure 4B:
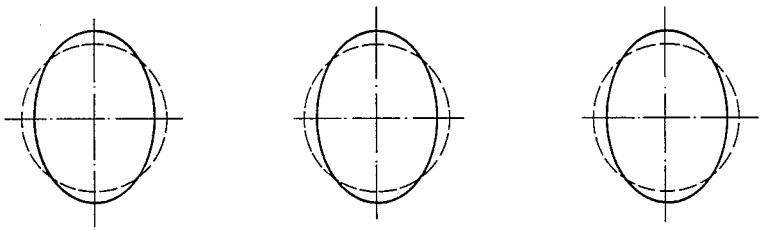
Figure 4C:
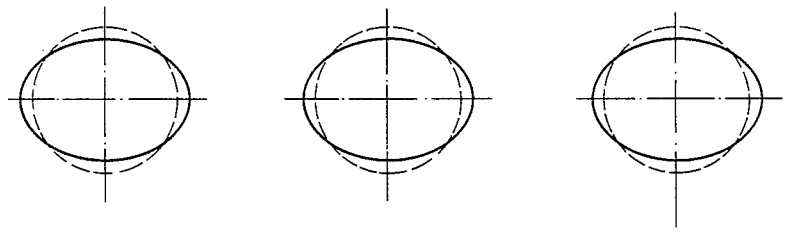
Figure 5A:
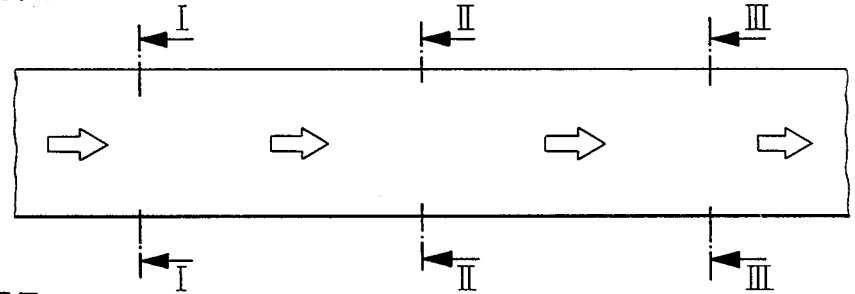
Figure 5B:
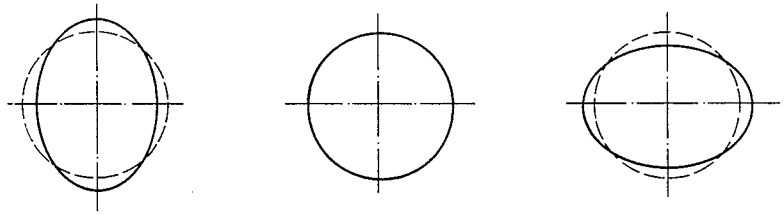

With regard to further advantageous embodiments of the invention attention is drawn to the subsidiary claims and to the following description of the drawings, wherein:

FIGS. 1A, 1B, 1C and, 1D, and 1E show in schematic illustration instantaneous states of measuring tube cross-sections which are set in peripheral oscillations of different modes, FIG. 2 shows a measuring arrangement according to the invention in partially sectioned view, FIG. 3 shows an alternative embodiment of the oscillation excitation for generating the oscillations according to FIG. 2, FIG. 4A shows a longitudinal portion of a measuring tube without mass flow, FIG. 4B shows cross-sections of the measuring tube used according to the invention along the lines I—I, II—II and III—III of FIG. 4A at a given instant, FIG. 4C shows cross-sections of the measuring tube used according to the invention along the lines I—I, II—II and III—III of FIG. 4A at another instant, FIG. 5A shows a longitudinal section of a measuring tube with schematically indicated mass flow and FIG. 5B shows cross-sections of the measuring tube used according to the invention along the lines I—I, II—II and III—III of FIG. 5A at a given instant.

Corresponding parts in the drawings are provided with identical reference numerals.

According to FIGS. 1A–1E for the flow measurement according to the invention peripheral oscillations are imparted to a measuring tube 1 and have frequences corresponding to the natural resonance frequences of the measuring tube in the peripheral oscillation mode. This leads to the aforementioned periodic deformations of the cross-section of the measuring tube 1. These are shown in dashed line in FIGS. 1A–1D whilst the circular full line therein shows the measuring tube cross-section in the unoscillating state of rest. The number n according to FIGS. 1A–1D denotes the order of the oscillations and modes and represents the number of the wavelengths which extend over the periphery of the measuring tube. In accordance with the arrows in FIGS. 1A–1D, according to the invention the deflection of the wall of the measuring tube is always in radial direction either towards the centre point of the measuring tube cross-section or away from said point. Any oscillation nodes occurring along the cross-section are denoted in FIGS. 1A–1D by the letter K. As indicated in each of FIGS. 1A–1E by an encircled point in the cross-sectional centre of the measuring tube 1 the flow direction of the fluid runs perpendicularly to the measuring tube cross-section into the plane of the drawings.

According to FIG. 1A the periphery of the measuring tube 1 is in the oscillation mode with n equal to zero. This means that over the measuring tube periphery no wave and no anti-nodes and nodes form. The diameter of the measuring tube 1 increases and decreases with a period duration corresponding to the predetermined resonance frequency uniformly over the measuring tube wall forming the measuring tube periphery.

In accordance with FIG. 1B the periphery of the measuring tube 1 is in the oscillation mode with n equal to two. This means that over the periphery of the measuring tube 1 two waves have propagated themselves each in full length and four nodes K have formed which lie uniformly distributed over the measuring tube periphery and substantially at equal distances apart In the region of the antinodes disposed between the nodes diametrically opposite wall portions of the measuring tube 1 are deflected in opposite senses, i.e. in opposite direction.

Figure 1D:
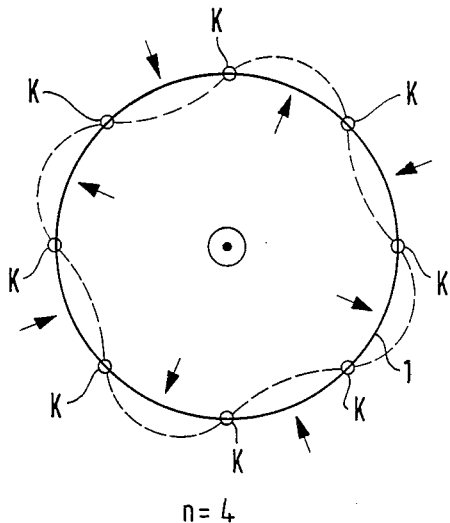

In accordance with FIG. 1D the periphery of the measuring tube 1 is in the oscillation mode with n equal to four which means that there are four waves with eight oscillation nodes uniformly distributed over the periphery of the measuring tube 1. Otherwise, the remarks made on FIG. 1B apply here accordingly.

According to FIG. 1C the periphery of the measuring tube 1 is in the oscillation mode with n equal to three which means that three wavelengths with six nodes are distributed uniformly over the measuring tube periphery. As apparent from the arrows in this embodiment of the invention diametrically opposite wall portions, unless they coincide with the regions of the nodes K, are deflected in the same sense, i.e. in each case in the same direction.

The oscillation modes with n greater or equal to two are generally known as "HOOPE oscillation modes".

Figure 1E:
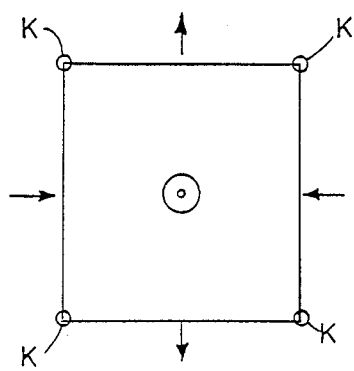

FIG. 1E illustrates a measuring tube having a polygonal cross-section taken transverse to the flow direction through the measuring tube. The four corners of the measuring tube shown in FIG. 1E form four oscillation nodes K.

In accordance with FIG. 2 the mass flow meter of the invention comprises essentially a measuring tube 1, a first and second oscillation exciter 5,6 and two optical sensor means T,R. The wall of the measuring tube 1 forming the cavity traversed by fluid is shown in longitudinal section in FIG. 1. As indicated schematically, the entry-side end 3 and the exit-side end 4 of the measuring tube 1 are each fixedly clamped. Fundamentally, a free suspension of the measuring tube ends 3,4 is also possible. Substantially in the centre of the measuring tube 1 the first and second oscillation generator 5,6 are arranged in such a manner that they lie opposite each other symmetrically with respect to the centre axis of the measuring tube 1. The electromechanical oscillation exciters 5,6 each comprise substantially an exciter coil 9 fed via the terminals 8 with alternating current and a permanent magnet 10 which is in operative connection therewith and has a southpole S and northpole N. The permanent magnets 10 are mounted directly on the measuring tube wall 2 whilst the exciter coils 9 are externally mounted. The optical sensors T,R are arranged in the entry and exit region respectively and consist essentially of a light transmitter T, an optical waveguide means 11, a light receiver R and immersion lugs 12 attached directly to the measuring tube wall 2.

The mode of operation is as follows: When an alternating current of predetermined frequency flows through the exciter coils 9 the permanent magnets 10 are alternately attracted and repelled with predetermined period. Correspondingly, forces act on the measuring tube wall 2 so that the latter is alternately subjected to tension and pressure with predetermined period. This leads to elastically reversible deformations of the cross-section of the measuring tube 1. On mass flow these deformations and the resulting deflections of the measuring tube wall 2 are phase-displaced over the length of the measuring tube 1. Immersion lugs 12 mounted on the measuring tube wall 2 take place which are time-displaced with respect to each other and correspond to the phase-displacement. The immersion lugs 12 each project into a gap which is formed by the optical waveguide means 11. In the example of embodiment illustrated the optical waveguide means consists of two rods of light-guide material, for example sapphire rods. The transmitter T generates a light flux which passes via the optical waveguide means 11 including the (air) gap formed thereby to the light receiver R. The intensity of the transmitted light flux depends on the depth to which the immersion lugs project into the (air) gap. The deeper they project the smaller the light flux. The depth to which the immersion lugs 11 project into the gap depends on the deflection of the measuring tube wall 2. Consequently, the difference between the two light intensities furnished by the optical sensors T,R is a measure of the time displacement or phase displacement of the deformation of the cross-section of the measuring tube over the length thereof.

According to FIG. 3 it is also within the scope of the invention to perform the oscillation excitation with a single oscillation exciter 6. If this is implemented as according to FIG. 2 with exciter coil and permanent magnet 10 attached to the measuring tube wall 2 a weight compensation of the mass of the permanent magnet 10 is advisable. For this purpose in accordance with FIG. 3 a compensation body 20 is provided. The latter can be secured from the outside to the wall 2 of the measuring tube 1 in the region diametrically opposite the wall region to which the permanent magnet 10 is secured. The mass/weight of the compensation body 20 is so dimensioned in accordance with the invention that imbalances caused by the permanent magnet are compensated. Otherwise, the part of the measuring arrangement not illustrated in FIG. 3 can be constructed as shown in FIG. 2.

The mode of operation of the flow measurement according to the invention is further illustrated in FIGS. 4A–4C and 5A and 5B.

In FIG. 4A the essential length portion of the measuring tube of a mass flow meter is schematically illustrated. It is assumed that the section line II—II (shown in dot-dash line) lies substantially in the centre region of the measuring tube. This is the preferred location of the oscillation excitation system which can be constructed for example in accordance with FIG. 2 or 3. The intersection lines I—I and III—III denote the points at which the sensors for detecting the phase displacement are located along the measuring tube length. Furthermore, in the illustration according to FIG. 4A it is assumed that there is no mass flow through the measuring tube. When the oscillation excitation system is set in operation the cross-section of the measuring tube is approximately overly deformed over its entire length as illustrated in FIGS. 4B and 4C. In the latter the deformations of the cross-sections along the lines I—I, II—II and III—III of FIG. 4A are shown in each case in full line. The dashed line indicates the cross-sections as they would appear if the oscillation excitation system were not in operation FIGS. 4B and 4C represent separate time-displaced instantaneous states, the time displacement corresponding to a phase displacement of the stimulated measuring tube oscillations of about 180 degrees This means that the peripheral portions of the measuring tube wall, which according to FIG. 4B are outwardly deflected with respect to the initial cross-section as shown by the dashed line, are pressed in towards the measuring tube interior in FIG. 4C. The deformations of the cross-sections of the measuring tube are substantially in phase, as illustrated, in the regions of the lines I—I, II—II and III—III because in the absence of mass flow no Coriolis forces act here.

In the schematically illustrated longitudinal portion of a tube according to FIG. 5A there is mass flow as indicated by the arrows therein directed to the right. It is further assumed that the cross-section of the measuring tube is deformed by peripheral oscillations according to FIGS. 4B and 4C substantially over the entire measuring tube length. Now, the fluid flowing through the measuring tube must take up energy on the entry side due to the peripheral oscillations and give up this absorbed energy again on the exit side. This leads to the formation of Coriolis forces which in the region of the entry-side half of the measuring tube retard the deflections of the measuring tube wall and in the region of the exit-side half of the measuring tube accelerate the deflections of the measuring tube wall. This results in phased displacements between the deflections of the wall portions along the fluid-traversed length of the measuring tube. Accordingly, the cross-section of the measuring tube according to line I-I of FIG. 5A is deformed differently to that according to the line III—III of FIG. 5A, as indicated in FIG. 5B by means of the four lines (greatly exaggerated). The dashed line in FIG. 5B shows the measuring tube cross-section as it would appear without the impression of deformation oscillations. According to FIG. 5B in the sectional illustration along the line II—II of FIG. 5A the cross-section coincides without deformation oscillations with that arising on impression of deformation oscillations. This is due to the fact that the section line II—II denotes the centre of the measuring tube and at this point the flowing fluid mass neither absorbs oscillation energy nor liberates such energy. Consequently, in the centre of the measuring tube no Coriolis forces arise so that the reference point and/or zero point of the phase displacement is assumed to be at said centre. To obtain a high measuring resolution the phase-displacement is preferably measured at the wall portions denoted by the section lines I—I and III—III.

We claim:

1. A method for mass flow measurement according to the Coriolis principle by means of an elastically deformable measuring tube through which a fluid flows, said method comprising the steps of effecting a periodic deformation of a cross-section of the measuring tube with an exciter in such a manner that portions of the measuring tube wall which lie diametrically opposite each other are radially deflected through substantially equal distances in the same direction or in opposite directions transversely of the flow direction of the fluid, detecting the tube wall deflections at locations on the measuring tube axially displaced from the exciter, and measuring the phase difference between the detected tube wall deflections which phase difference is indicative of the mass flow of the fluid.

2. A method as claimed in claim 1, wherein said periodic deformation is effected with a frequency corresponding to one of the natural resonance frequencies of radially directed peripheral oscillations of the measuring tube wall.

3. A method as claimed in claim 2, comprising the further step of superimposing on said radially directed peripheral oscillations flexural oscillations of the measuring tube having a frequency corresponding to one of the natural resonance frequencies of flexural oscillations of the measuring tube.

4. A method as claimed in claim 3, wherein the frequency of said radially directed peripheral oscillations corresponds to the natural resonance frequency of the second order, and the frequency of said flexural oscillations corresponds to a natural resonance frequency of the third or fourth order.

5. A method as claimed in claim 1, wherein said periodic deformation is produced by applying to the measuring tube wall at at least one point thereof a radially directed force the direction of which is periodically reversed with a frequency corresponding to one of the natural resonance frequencies of radially directed peripheral oscillations.

6. A mass flow meter as claimed in claim 5, wherein the point or each point at which a periodically reversed force is applied to the measuring tube wall is situated substantially in the center of the length of the measuring tube.

7. A method as claimed in claim 5, wherein at least one pair of periodically reversed forces is applied to the measuring tube wall at two points which are diametrically opposite each other.

8. A method as claimed in claim 7, wherein the directions of the two forces of said pair or each pair are always opposite each other.

9. A method as claimed in claim 7, wherein the directions of the two forces of said pair or each pair are always equal.

10. A Coriolis-type mass flow meter comprising a measuring tube adapted to be inserted in a fluid conduit, at least one oscillation exciter which acts on the measuring tube to produce a periodic deformation of a cross-section of the measuring tube wall in such a manner that portions of the measuring tube wall which lie diametrically opposite each other are radially deflected through substantially equal distances in the same direction or in opposite directions, and a phase detector system comprising sensor means for detecting the tube wall deflections at locations on the measuring tube which are axially displaced from the exciter and means for measuring the phase difference between said detected tube wall deflections.

11. A mass flow meter as claimed in claim 10, wherein said measuring tube is rectilinear.

12. A mass flow meter as claimed in claim 10, wherein said measuring tube has a circular cross-section.

13. A mass flow meter as claimed in claim 10, wherein said measuring tube has a polygonal cross-section with an even number of corners.

14. A mass flow meter as claimed in claim 13, wherein each of said sensor means is arranged to detect the tube wall deflections in the center of the cross-section line extending between two corners.

15. A mass flow meter as claimed in claim 10, wherein each of said sensor means comprises a light transmitter, a light receiver and optical wave guide means for transmitting the light of said light transmitter to the light receiver in such a manner that the intensity of the transmitted light flux is influenced by the deflection of the wall of the measuring tube.

16. A mass flow meter as claimed in claim 15, wherein said optical wave guide means comprises two sapphire rods of which one is connected at one end to the light transmitter and the other is connected at one end to the light receiver, the other ends of the two sapphire rods being constructed as totally reflecting prisms which are spaced from each other with a gap therebetween, so that the light flux going from the light transmitter through the one sapphire rod passes through said gap and enters the other sapphire rod through which it is conducted to the light receiver, at least one immersion lug being disposed at the wall of the measuring tube in such a manner that in dependence upon the deflection of the wall it projects to a greater or lesser extent into the gap formed between the prism-like ends of the sapphire rods.

17. A mass flow meter as claimed in claim 10, wherein said oscillation exciter comprises one or more electromagnetic transducers.

18. A mass flow meter as claimed in claim 10, wherein said oscillation exciter comprises one or more electrostatic transducers.

19. A mass flow meter as claimed in claim 10, wherein said oscillation exciter comprises one or more electroacoustic transducers.

20. A mass flow meter as claimed in claim 17, wherein said oscillation exciter comprises an electromagnet fixedly mounted outside of the measuring tube and a permanent magnet mounted opposite said electromagnet on the measuring tube wall, a compensating body being arranged on the measuring tube wall diametrically opposite the permanent magnet, the mass of said compensating body corresponding substantially to that of the permanent magnet.

21. A mass flow meter as claimed in claim 10, comprising at least two oscillation exciters which are arranged at diametrically opposite portions of the wall of the measuring tube and generate oscillations which are phase-displaced by 180 degrees with respect to each other.

* * * * *

UNITED STATES PATENT AND TRADEMARK OFFICE
CERTIFICATE OF CORRECTION

PATENT NO. : 4,949,583

DATED : August 21, 1990

INVENTOR(S) : Lang et al.

It is certified that error appears in the above-identified patent and that said Letters Patent is hereby corrected as shown below:

In column 5, line 28, replace "FIGS. 1A-1D" with --FIGS. 1A-1E--.

In column 5, line 33, replace "FIGS. 1A-1D" with --FIGS. 1A-1E--.

Signed and Sealed this

Third Day of December, 1991

Attest:

HARRY F. MANBECK, JR.

Attesting Officer

Commissioner of Patents and Trademarks